Nov. 15, 1932.     A. S. KNAPP     1,887,764
GRAPEFRUIT JUICE EXTRACTOR
Filed July 3, 1930
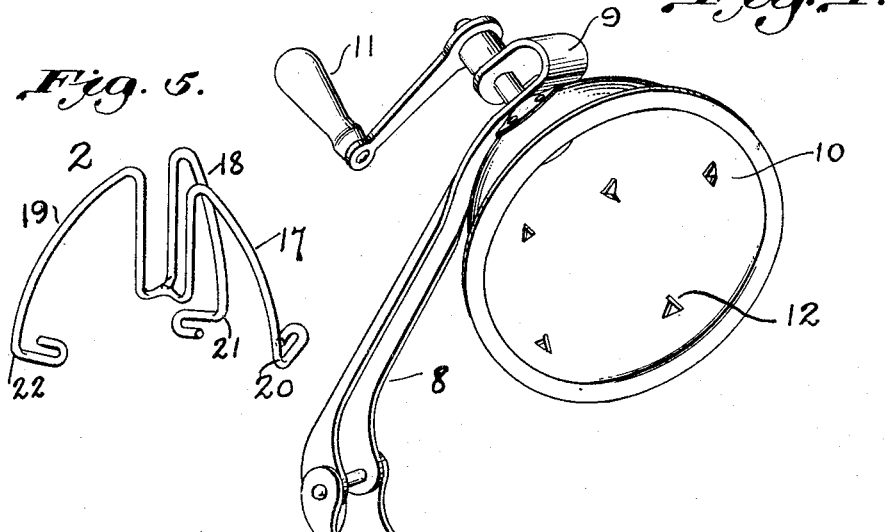
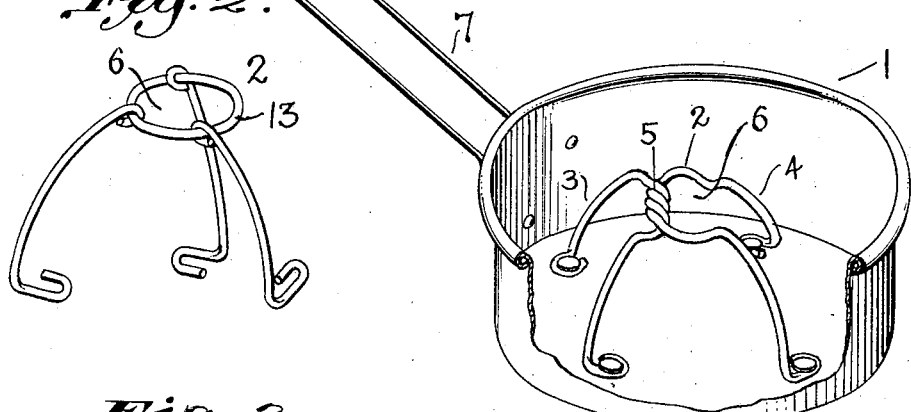
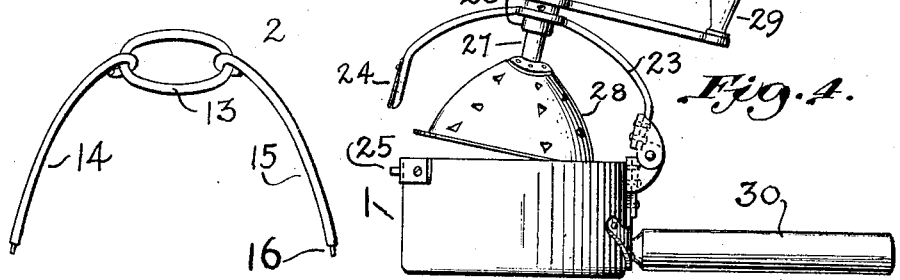
INVENTOR
Andrew S. Knapp,
By Edward Williams  Attorney Patented Nov. 15, 1932

1,887,764

UNITED STATES PATENT OFFICE

ANDREW STEPHEN KNAPP, OF ST. LOUIS, MISSOURI, ASSIGNOR TO KNAPP MONARCH COMPANY, INC., A CORPORATION OF MISSOURI

GRAPEFRUIT JUICE EXTRACTOR

Application filed July 3, 1930. Serial No. 465,721.

My invention relates to improvements in fruit juice extractors and more particularly to a device for extracting the juices from citrus fruits such as grapefruit and the like.

In the past the art has looked upon the problem of extracting the juice from grapefruit as calling for a simple enlargement of the ordinary orange or lemon juicer, and with this enlargement of the smaller juicers there has also followed the problem of overcoming the additional effort which is required to break down the tough fibers of the grapefruit. Furthermore, the skin and white portion of the grapefruit contain substances which should be kept from mixing with the extracted juice.

An object of my invention is to provide for the complete extraction of the juices from the grapefruit with great ease and extreme rapidity, substantially without tearing the skin, which if torn would free objectionable bitter substances impairing the taste of the juice.

Another object of my invention is to reduce to a minimum the resistance offered by the grapefruit during extraction of the juice from the cellular portion thereof, while efficiently breaking down all the juice carrying cells.

A further object of my invention is to provide a convenient and readily cleanable household fruit juice extractor which any member of the houshold may use to extract the juice from grapefruit.

Still another object of my invention is to enable the taking of juice from grapefruit and the like by applying a force between the tough fibrous central core and the skin of the grapefruit in order to break down the cellular portion containing the juice, thus eliminating the resistance offered by the core.

Other objects and advantages will become apparent as the description proceeds.

As I have indicated the ordinary citrus fruits such as lemons and oranges do not contain fibers and cores that offer such resistance to the juice extracting member as becomes important when the juice carrying cells are ruptured. However, with grapefruit the tough fibers and particularly the hard central core make the juice extracting operation very difficult and hard to accomplish.

In certain types of extracting members openings have been provided having knife edges in juxtaposition thereto or sharp cutting surfaces but the ease of operation with which my extractor may be operated is not obtained by these extractors, and the macerating and cutting of the white portion of the grapefruit on these knife edges releases the objectionable bitter substances above referred to.

Accordingly, I may provide, in a juice extractor constructed along the general lines of the disclosure in the Elliott and Nichols Patent 1,743,661, an extracting member whose working surfaces do not extend to the geometrical center of the extracting member. In other words the extractor is designed so as not to interfere with the downward travel of the core. By this unique construction of the juice extracting member the resistance which the hard core would offer in extracting the juice from the fruit is overcome. It will be noticed that as the fruit is rotated and worked over such an extracting member a pressure is applied only on the juice containing cells between the core and the skin of the fruit. The juice cells are ruptured and the effort to do this is minimized because the resistance which would be offered to the pressure applied on the relatively hard tough core is eliminated. I prefer to form my extracting member of rigid wires. Wires are particularly advantageous because a blunt edge is presented to the juice carrying cells.

Referring now to the drawing, Fig. 1 is a perspective view of my improved grapefruit juicer.

Figs. 2, 3 and 5 illustrate in perspective various forms which the juice extracting member may take, and Fig. 4 shows a side view of a modified form of juice extractor.

In accordance with the present invention I place within a juice receiving cup 1, a juice extracting member 2 which in Fig. 1 is shown constructed of two wires 3 and 4 wound together as at 5 and so formed as to bound an incomplete closure as at 6. To the side of the cup is secured an arm 7 and to the other end of the arm 7 is hingedly connected a second arm 8 whose other end 9 rotatively supports an impaling member 10. A crank 11 is provided for the rotation of the impaling member. The grapefruit is first cut into two parts and one half is placed over the extractor 2 and it will be noticed that the core of the grapefruit naturally will rest within the opening 6. The impaling member 10 is then lowered until the tangs 12 engage the skin of the fruit. The arms 7 and 8 are then grasped in one hand and a slight amount of pressure is applied to the fruit through the impaling member. The handle 11 is rotated (through the cooperating impaling member 10 and the tangs 12) rotating the grapefruit over the extractor 2. By applying pressure between the impaling member and the juice extractor a force is exerted on the juice carrying cells between the core and the skin of the fruit, rupturing the cells and releasing the juices which flow to the bottom of the juice receiving cup 1. As the extracting operation continues the pressure is maintained and more and more of the juice carrying cells are ruptured while the core finds its way down through the incomplete closure. Thus a minimum of resistance is offered to the forces which are rupturing the juice carring cells. By arranging the opening for the passage of the core of the fruit the resistance which it would otherwise offer and which is of a large magnitude is practically eliminated, forming a very important part of the present invention. It is also important to eliminate all cutting edges and the wires are particularly adapted for the presentation of a blunt edged extracting member.

I prefer to have the opening 6 in the form of an incomplete closure as I have illustrated it in Fig. 1, as this reduces to a greater degree the resistance offered by the core during the juice extracting operation than the provision of an entirely bounded opening.

With the foregoing in mind one skilled in the art may now form the juice extractor in many ways and it is obvious to one skilled in the art that instead of twisting the wires together as I have illustrated in Fig. 1 they may well be welded together or formed by any suitable means. Instead of providing two wires I may use three as I have illustrated in Fig. 2. In this figure the member 13 completely bounds the opening 6 and the wires may be spot welded to the member 13 or they may be secured thereto by other well known means.

Fig. 3 illustrates a juice extractor member 2 formed by a member 13 but with two supporting members 14 and 15. With this arrangement the grapefruit is deformed along a plane taken through the supporting members 14 and 15, and of course, it is obvious to those skilled in the art that two downwardly divergent wire loops could be arranged side by side to form the extracting member.

Fig. 5 shows a juice extracting member 2 with the working surfaces 17, 18 and 19 limited to less than half the diameter of a plane taken through the three outermost ends, 20, 21 and 22 of the said members. It is to be noted that by this construction no resistance is offered to the core of the fruit during a juice extracting operation.

A fruit juicer may be formed as illustrated in Fig. 4 wherein the juice receiving cup 1 hingedly supports one end of a member 23, the other end 24 being provided with a spring catch cooperating with a pin 25 secured to the juice receiving cup. A bearing 26 is supported intermediate the end of the member 23. Through this bearing is shaft 27 which carries at one end the fruit impaling member 28 and at the other end the crank 29. This construction is particularly advantageous inasmuch as the impaling member 28 moves along the geometrical axis of the extracting member.

In operation the fruit is cut into two parts and one placed over the extracting member within the cup. The hinge member 23 is lowered until the catch 24 engages the pin 25, locking the parts thereof in working relationship. Since the shaft 27 is slidably mounted in the bearing 26 the impaling member striking the skin of the fruit raises shaft 27 carrying the handle 29 upwardly. The handle 30 rigidly secured to the juice cup is grasped and crank handle 29 is rotated and a slight amount of pressure is continuously applied. It is to be noted that as the fruit is rotated over the extracting member the impaling member gradually urges the fruit downwardly and since the impaling member and the fruit move along the geometrical axis of the extracting member the tendency for a greater amount of pressure to be applied along one edge of the extracting member and the skin of the fruit is eliminated.

The juice extractor may be secured within the cup by any suitable means. It may be removably secured by the provision of headed rivets and the like. It may be riveted to the bottom of the cup or shouldered extensions 16 may be provided as I have illustrated in Fig. 3, and the shank spot welded to further strengthen the support and to insure against leakage of the juice from the cup.

While the embodiments of the invention illustrated in the drawing have been described with considerable particularity it is to be expressly understood that the invention is not limited thereto, as the invention may be carried out in a variety of ways, some of which will now readily suggest themselves to those skilled in the art, while changes may be made in detail, the dimensions, and arrangements, and certain features used without other features, without departing from the spirit of this invention. Reference is therefore to be had to the claims hereto appended for definition of my invention.

I claim:

1. In a fruit juice extractor for fruit having a hard core, means for rotating said fruit, means for applying between the core and the skin a force to rupture the fruit carrying cells comprising a plurality of downwardly divergent wire loops so spaced as to permit the core to pass therethrough at their intersection, and means for applying pressure between said first means and said second means during the juice extracting operation.

2. In a fruit juice extractor the combination of a juice receptacle, a juice extractor rigidly secured within the receptacle comprising a net work of downwardly divergent members, the working surfaces of said members approaching the intersection of the said members but not extending to said intersection thereby permitting the core of the fruit to pass therethrough, and means for rotating said fruit progressively over said extractor during the juice extracting operation.

3. In a fruit juice extractor, means for breaking down the juice carrying cells between the core of said fruit and the skin including a centrally and horizontally positioned circular member, outwardly and downwardly divergent wire loops rigidly secured thereto and means for rotating the fruit progressively over said first mentioned means.

4. In a fruit juice extractor, the combination of a juice receiving cup, means within said cup for breaking down the juice carrying cells between the core of said fruit and the skin thereof including a centrally and horizontally positioned annular member provided with outwardly and downwardly divergent wire loops rigidly secured thereto, a fruit impaling member and means permitting the impaling member to be progressively rotated over the first named means.

5. In an article of manufacture, a fruit juice extractor consisting of a plurality of outwardly and downwardly divergent wire loops, said loops being secured together off-centrally and horizontally relative to said fruit juice extractor, the portions of said loops which are secured together forming a C-shaped opening.

6. A fruit juice extractor including a plurality of outwardly and downwardly divergent wire loops, the juice cell engaging surfaces of said loops approaching the horizontally central part of said extractor but not extending thereto and means for relatively rotating the fruit over said wire loops whereby the core of the fruit may pass through said center during the juice extracting operation.

7. In an article of manufacture, a fruit juice extractor consisting of a plurality of intersecting outwardly and downwardly divergent wire lops, said loops being intertwined at their intersection, said intersecting portion being located horizontally off-center of said extractor so as to leave an unobstructed space at said center.

In witness whereof, I have hereunto subscribed my name.

ANDREW S. KNAPP.